Aug. 9, 1927.
F. R. KLAUS
1,638,810
CUSHION TIRE STRUCTURE AND METHOD OF APPLYING TO WHEELS
Filed Dec. 16, 1922
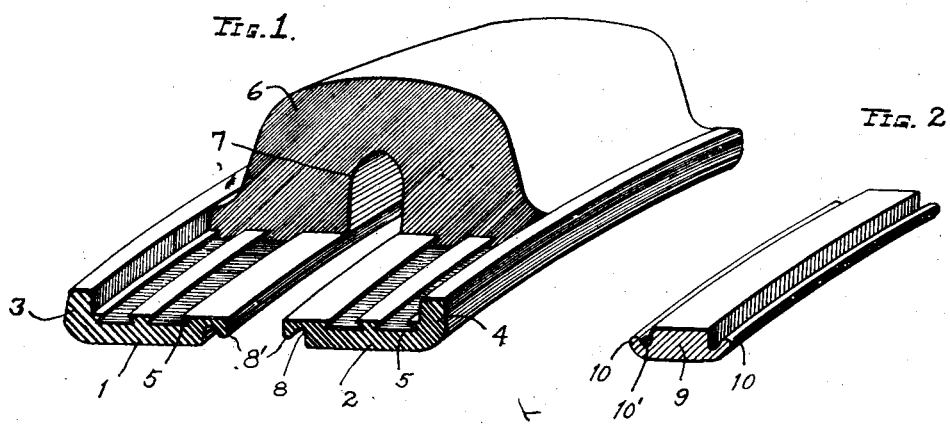
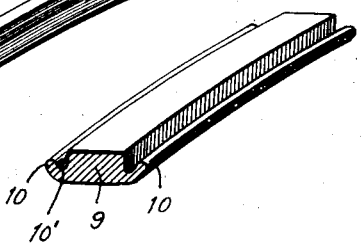
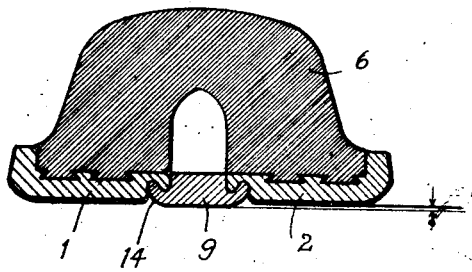
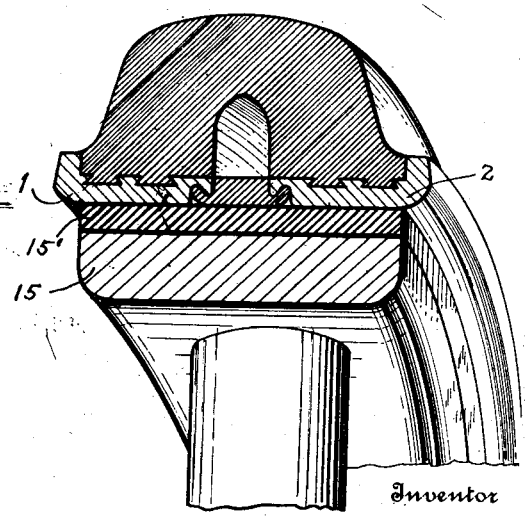
Inventor
F. R. KLAUS.
By Lloyd L. Evans
Attorney Patented Aug. 9, 1927.

1,638,810

UNITED STATES PATENT OFFICE.

FRED R. KLAUS, OF WARREN, OHIO, ASSIGNOR TO THE AMERICAN WELDING AND MANUFACTURING COMPANY, OF WARREN, OHIO, A CORPORATION OF OHIO.

CUSHION TIRE STRUCTURE AND METHOD OF APPLYING TO WHEELS.

Application filed December 16, 1922. Serial No. 607,461.

The present invention relates to a tire structure for wheels and the method of applying the same to a wheel body, and pertains more particularly to a cushion tire structure of the type in which a tire with an inner recess or channel forming an air cushion is molded and cured directly upon the tire base.

An object of the invention is to provide a tire structure of the character referred to which will not become distorted when forced by heavy pressure upon the fixed rim of a wheel.

Another object of this invention is to provide a sectional rim or base in which the central spacing ring and the outer base sections have connecting means preventing relative movement of the parts when assembled upon the fixed rim of a wheel.

A further object is to provide a method in which the spacing ring of the tire base in the manufacture of the tire structure is not expanded into complete engagement with the side sections before applying the base to a wheel body but is expanded into full interlocking engagement when the tire structure is forced upon the fixed rim of the wheel.

A further object of the invention is to provide a sectional base in which the spacing ring when in fully expanded position on the felly of a wheel insures a positive frictional engagement between all parts of the base and the felly, and between the side sections and ring, thus accurately positioning and rigidly holding the parts of the base against relative movement when mounted upon the wheel.

Reference should be had to the accompanying drawings forming a part of this specification in which Figure 1 is a fragmentary perspective view partly in section showing the tire and side sections of the rim.

Fig. 2 is a fragmentary perspective view of a portion of the locking ring.

Fig. 3 is a sectional view of the base assembled ready to be put on a wheel body.

Fig. 4 is a fragmentary perspective partly in section showing the rim and tire mounted on a wheel body.

Referring to the drawing, the tire base is made up of a pair of annular side sections 1 and 2 which are preferably endless rings and are provided with outturned flanges 3 and 4 and peripheral locking grooves 5 for receiving the rubber tire 6. The rubber tire is of the type recessed or channeled as at 7 between the side portions, which are secured to the rim base sections 1 and 2 in a well known manner, wherein a layer of hard rubber is interlocked with suitable grooves in the base sections and the soft rubber of the tire is united to the hard rubber.

At their inner edges the sections 1 and 2 are grooved circumferentially at 8 to form ribs 8' to interlock with a spacing structure such as an inverted T-shaped ring 9 having complementary members such as ribs 10 and grooves 10'. The spacing ring 9 is of slightly smaller diameter than the sections 1 and 2 and is stretched or expanded into place in any suitable manner after the rubber tire is vulcanized on to the said sections and the cores removed.

By omitting the spacing ring until after the tire sections are secured to the base sections, an unobstructed space is provided between the side sections of the base for the insertion and removal of the core for the the recess in the tire while it is vulcanized to the base sections.

The expanding machine may be of any suitable type but it is preferably a machine carrying a number of movable segmental blocks such as indicated in the copending application Serial No. 570,615, filed June 24, 1922, by Fred R. Klaus and Frank H. Meyer.

In the present invention the ring 9 is not expanded by the expanding machine completely into engagement with the side sections, the expanding operation being discontinued before the internal diameter of the ring 9 is quite as great as that of the side sections.

The inner face of the spacing ring is rounded at the edges as at 14 so that the application of the tire base to the wheel will be facilitated and there will be no sharp corners to catch on the fixed rim 15 of the wheel or interfere when applying the base to the wheel. In assembling the tire structure upon the wheel body the base is pressed laterally with a relatively great pressure onto a fixed rim of a wheel which is usually made of metal or carries a metal felly band, 15' as shown in Fig. 4.

The tire base is usually made slightly smaller in diameter than the outer diameter of the fixed rim of a wheel, so that the former will have a rigid frictional engagement therewith.

When applying the tire base on a fixed rim of a wheel, pressure is applied around the circumference of the base in an axial direction and as the spacing ring has members to engage the adjacent portions of the side sections there will be no tendency for distortion of the base as might be caused by relative movement of the side sections laterally or circumferentially. When the spacing ring is being forced on the felly it will be expanded circumferentially relatively slightly more than the side sections and exert a radial pressure outwardly against the overhanging portions of the side sections. As these interengaging parts are wedge shaped, the side sections will be accurately positioned and a good contact will be insured between all parts of the base and the fixed rim of the wheel and between the ring and the adjacent sections.

Such a construction is as rigid in use as though the rim and side sections were permanently secured, as for example by welding, but in this construction when the base is removed from the wheel the locking ring can be removed to reclaim the side sections for reuse.

If it is deemed necessary or desirable to positively lock the side sections against relative circumferential movement, a good means to accomplish this is disclosed in application for Letters Patent filed by Frank H. Meyer Nov. 25, 1922, Serial No. 603,289.

It will be noticed that the side sections and the ring frictionally engage the wheel throughout substantially the entire area of their inner faces so that the tire member is securely held in place.

The interfitting ribs and grooves of the spacing ring and side sections of the base are preferably dovetailed or undercut at such an angle that they will facilitate their complete and accurate engagement when the ring is stretched into position. Also by having the angle of the undercut relatively great, movement of the side sections laterally relative to each other is prevented because they are tensioned on the ring which prevents the necessary radial expansion to permit lateral movement.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A vehicle wheel structure comprising a pair of spaced annular side sections, a ring interposed between said side sections and interlocking with them, said ring having its inside diameter less than said side sections and having its inside edges rounded whereby forcing such tire structure upon the fixed rim of a wheel body causes said ring to be expanded.

2. A vehicle wheel structure comprising a pair of endless metal base members having a cushion tire body of arched cross sectional form secured thereto, a spacing ring interposed between said members and interlocking therewith, said members and ring having frictional engagement with the fixed rim of a wheel body, said ring having a relatively greater tension and frictional engagement than said members, whereby said members and ring are held against movement relative to each other.

In testimony whereof, I hereunto affix my signature.

FRED R. KLAUS.